United States Patent
Takeshita et al.

(10) Patent No.: US 8,797,863 B2
(45) Date of Patent: Aug. 5, 2014

(54) MOBILE COMMUNICATION SYSTEM AND COMMUNICATION CONTROL METHOD

(75) Inventors: Mayu Takeshita, Tokyo (JP); Jinsock Lee, Tokyo (JP); Kojiro Hamabe, Tokyo (JP)

(73) Assignee: NEC Corporation, Tokyo (JP)

( * ) Notice: Subject to any disclaimer, the term of this patent is extended or adjusted under 35 U.S.C. 154(b) by 1067 days.

(21) Appl. No.: 11/916,080

(22) PCT Filed: May 31, 2006

(86) PCT No.: PCT/JP2006/310863
§ 371 (c)(1),
(2), (4) Date: Nov. 30, 2007

(87) PCT Pub. No.: WO2006/129698
PCT Pub. Date: Dec. 7, 2006

(65) Prior Publication Data
US 2010/0189045 A1 Jul. 29, 2010

(30) Foreign Application Priority Data
May 31, 2005 (JP) .................................. 2005-159490

(51) Int. Cl.
*H04W 72/04* (2009.01)
(52) U.S. Cl.
USPC .................. 370/230.1; 370/329; 455/450
(58) Field of Classification Search
USPC .................. 370/329, 230.1; 455/450
See application file for complete search history.

(56) References Cited

U.S. PATENT DOCUMENTS 5,742,593 A * 4/1998 Sharony et al. ............... 370/330
7,813,312 B2 * 10/2010 Castor et al. .................. 370/328
(Continued)

FOREIGN PATENT DOCUMENTS

EP 1434458 A1 6/2004
JP 2002078012 3/2002
(Continued)

OTHER PUBLICATIONS

Korean Office Action for KR 10-2007-7027289 issued Oct. 29, 2009.
(Continued)

*Primary Examiner* — Donald Mills
*Assistant Examiner* — Henry Baron
(74) *Attorney, Agent, or Firm* — Sughrue Mion, PLLC

(57) ABSTRACT

A communication control method is provided which improves a wireless resource usage rate, is available to recognize a variation in wireless resource state in advance, and is available to control communication in accordance with the variation in a mobile communication system in which an MBMS and an HSDPA coexist and the same wireless resource is shared and used. A MAC-m transmits information related to a wireless resource used on an MBMS transport channel at a transmission timing of a base station to a MAC-hs before the transmission timing. The MAC-hs receives the information related to the wireless resource of the MBMS transport channel from the MAC-m. The MAC-hs calculates a wireless resource which can be used applied to data of a HSDPA transport channel at the transmission timing with using the information related to the wireless resource of the MBMS transport channel and a wireless resource to which the HSDPA transport channel is allocated. The MAC-hs controls communication of the data in accordance with the wireless resource of the calculation result.

12 Claims, 9 Drawing Sheets

(56) References Cited

U.S. PATENT DOCUMENTS

| | | | |
|---|---|---|---|
| 2003/0202532 | A1 | 10/2003 | Peelen et al. |
| 2003/0207696 | A1 | 11/2003 | Willenegger et al. |
| 2005/0207367 | A1* | 9/2005 | Onggosanusi et al. ....... 370/315 |
| 2008/0192630 | A1* | 8/2008 | Klimmek et al. .......... 370/230.1 |
| 2008/0220787 | A1* | 9/2008 | Stanwood et al. ............ 455/450 |
| 2009/0253435 | A1* | 10/2009 | Olofsson et al. .............. 455/450 |

FOREIGN PATENT DOCUMENTS

| | | |
|---|---|---|
| JP | 2003283507 | 10/2003 |
| JP | 2003348642 | 12/2003 |
| JP | 2004040770 | 2/2004 |
| JP | 2004112428 | 4/2004 |
| JP | 2004135283 | 4/2004 |
| JP | 2004166236 | 6/2004 |
| JP | 2004221760 | 8/2004 |
| JP | 2005064872 | 3/2005 |
| WO | 02091597 A2 | 11/2002 |
| WO | 03103329 | 12/2003 |
| WO | 2005079098 A1 | 8/2005 |

OTHER PUBLICATIONS

3GPP TS 25.321 V6.3.0 (Dec. 2004) 3rd Generation Partnership Project; Technical Specification Group Radio Access Network; Medium Access Control (MAC) protocol specification, pp. 9-27, Release 6.

3GPP TS 25.346 V6.2.0 (Sep. 2004) 3rd Generation Partnership Project; Technical Specification Group Radio Access Network; Introduction of the Multimedia Broadcast Multicast Service (MBMS) in the Radio Access Network (RAN); Stage 2, pp. 6-8, Release 6.

PCT/JP2006/310863 International Search Report, mailed Jul. 25, 2006.

Extended European search report for 06747036 dated Jun. 14, 2012.

IPWIRELESS: "Draft Changes to 25.321 for Introduction of 7.68 Mcps TDD Option", 3GPP Draft; 25321CR_Draft, 3rd Generation Partnership Project (3GPP), Mobile Competence Centre ; 650, Route DES Lucioles ; F-06921 Sophia-Antipolis Cedex ; France vol. RAN WG2, no. Athens, Greece; 20050503, May 3, 2005, XP050128420, [retrieved on May 3, 2005].

LG Electronics: "Feature Clean-up: Removal of DSCH (FDD)", 3GPP Draft; R2-051322_DSCH_321_R6, 3rd Generation Partnership Project (3GPP), Mobile Competence Centre ; 650, Route DES Lucioles; F-06921 Sophia-Antipolis Cedex; France, vol. RAN WG2, no. Athens, Greece; 20050516, May 16, 2005, XP050128536, [retrieved on May 16, 2005].

LG Electronics, "Introduction of MBMS",3GPP TSG-RAN Working Group 2 No. 45, R2-042713, 25.321 CR 202, 3rd Generation Partnership Project (3GPP), Shin-Yokohama, Japan; Nov. 23, 2004, XP050127221, [retrieved on Nov. 23, 2004], Cited in the Extended European Search Report.

The Extended European Search Report for EP 13 151 393.9 dated on Apr. 3, 2013.

\* cited by examiner

FIG.4
| MBMS contents ID | 4 |
|---|---|
| TRANSMISSION TIMING | CFN = 10 |
| TRANSMISSION POWER | 5W |
| APPLIED SUBCARRIER | Sc1,Sc3,Sc5 |
| APPLIED CODE | C1,C2 |
FIG.5
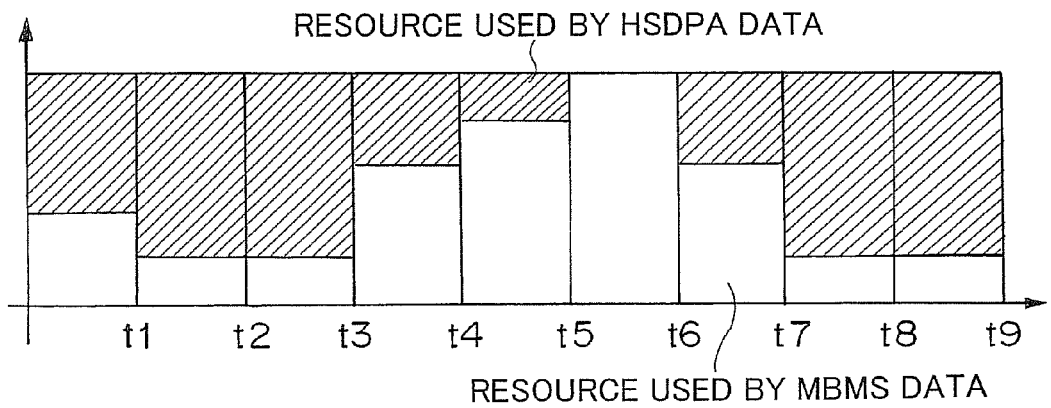
FIG.6
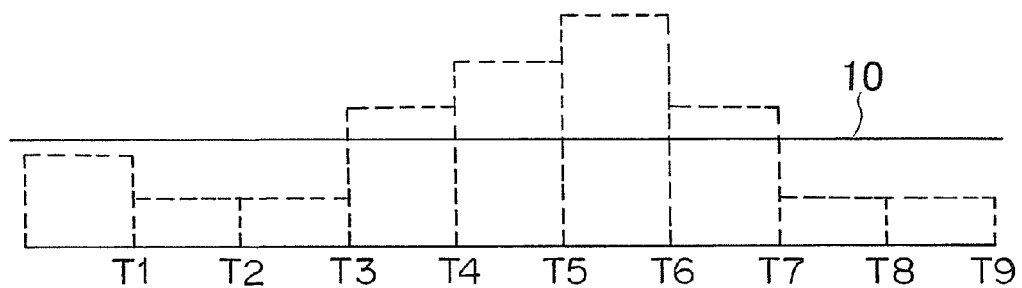

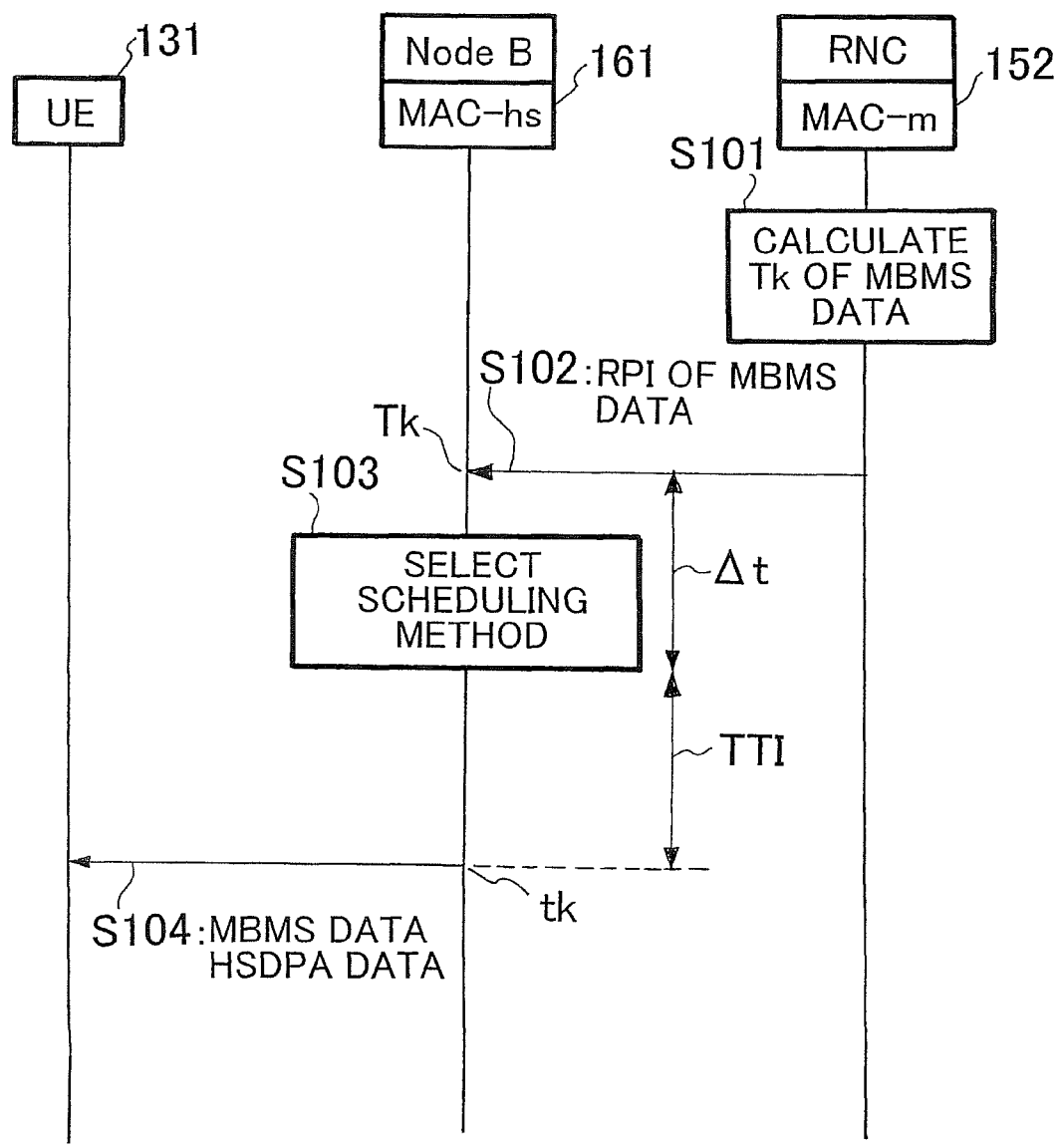

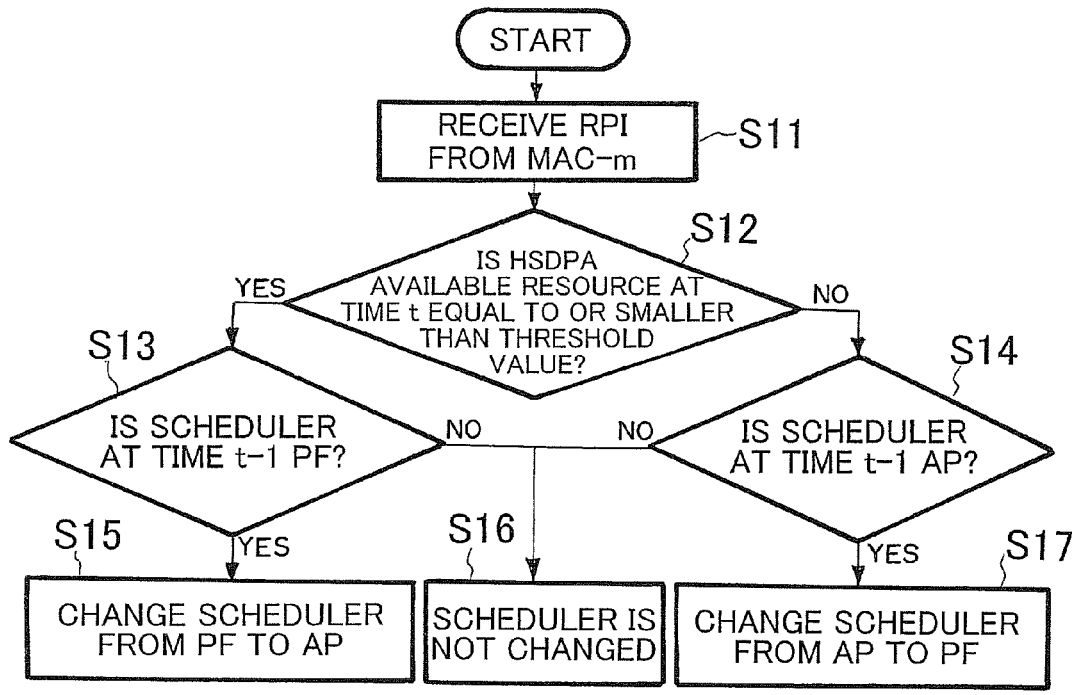
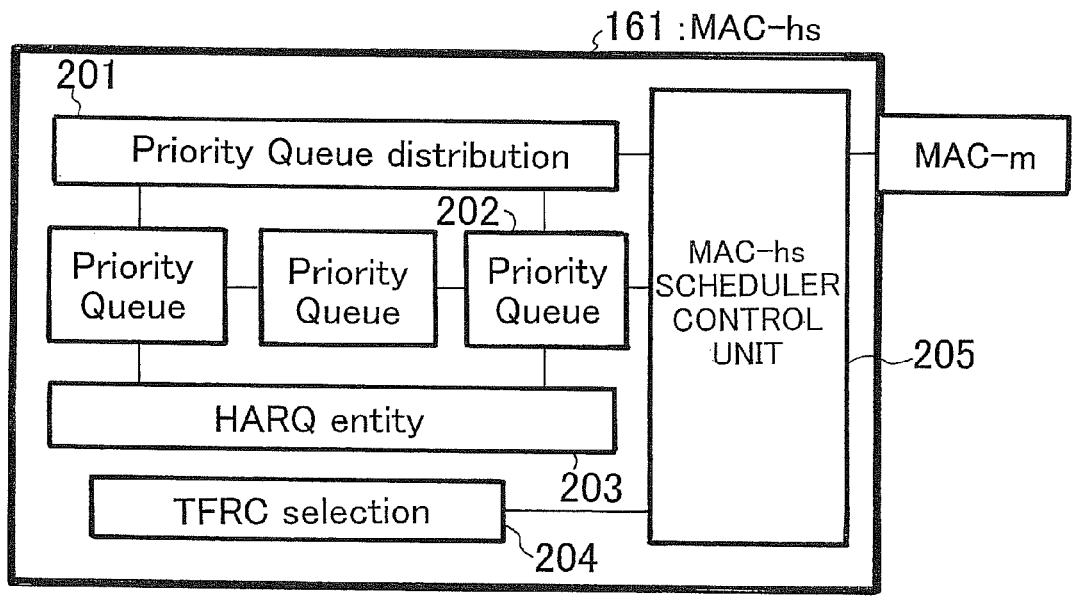

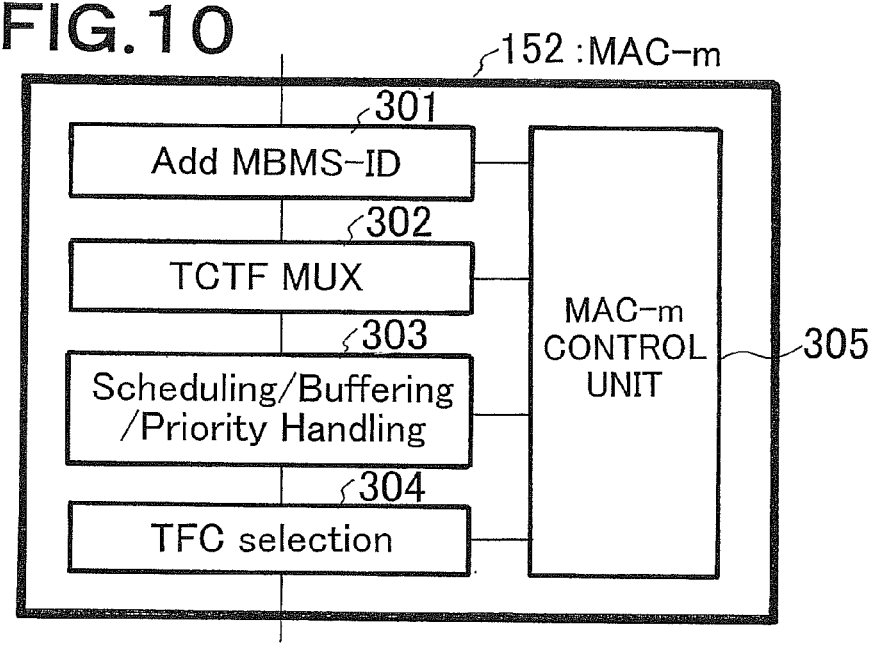
FIG.10
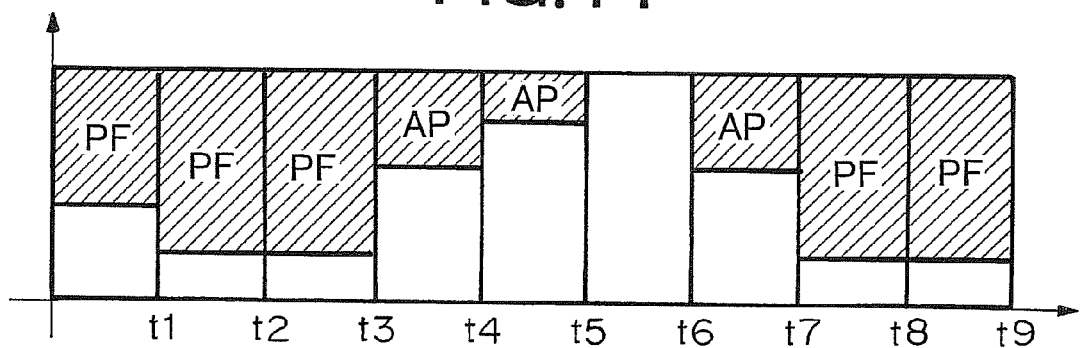
FIG.11
FIG.12
| PRIORITY | WIRELESS RESOURCE RATIO | |
| --- | --- | --- |
| | mode1 | mode2 |
| 1 | 50% | 70% |
| 2 | 30% | 20% |
| 3 | 20% | 10% |

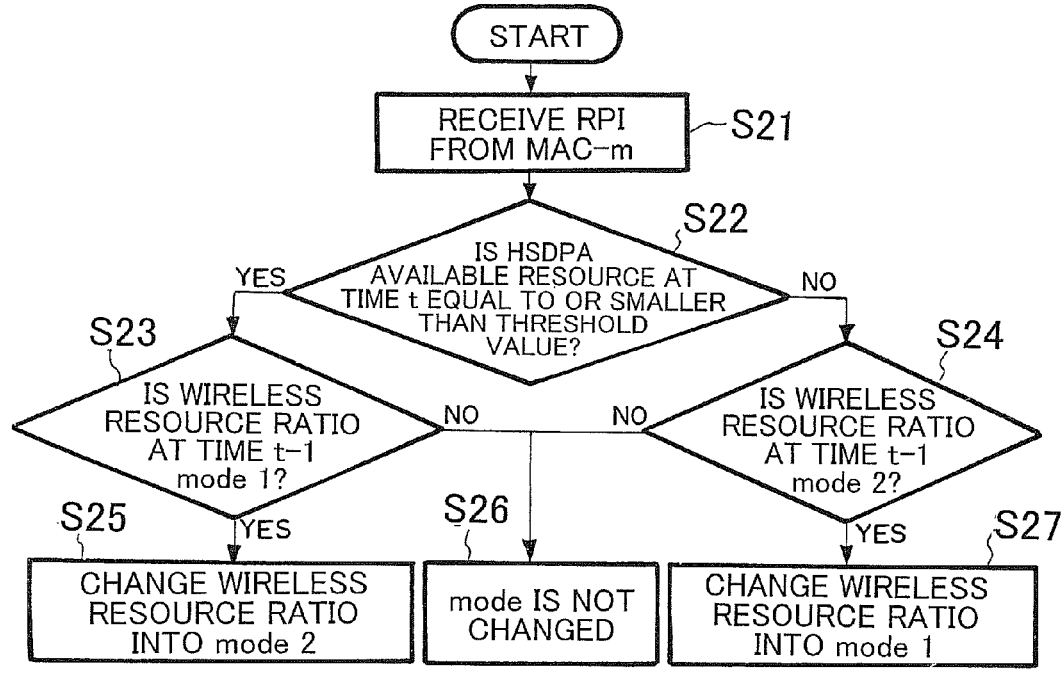
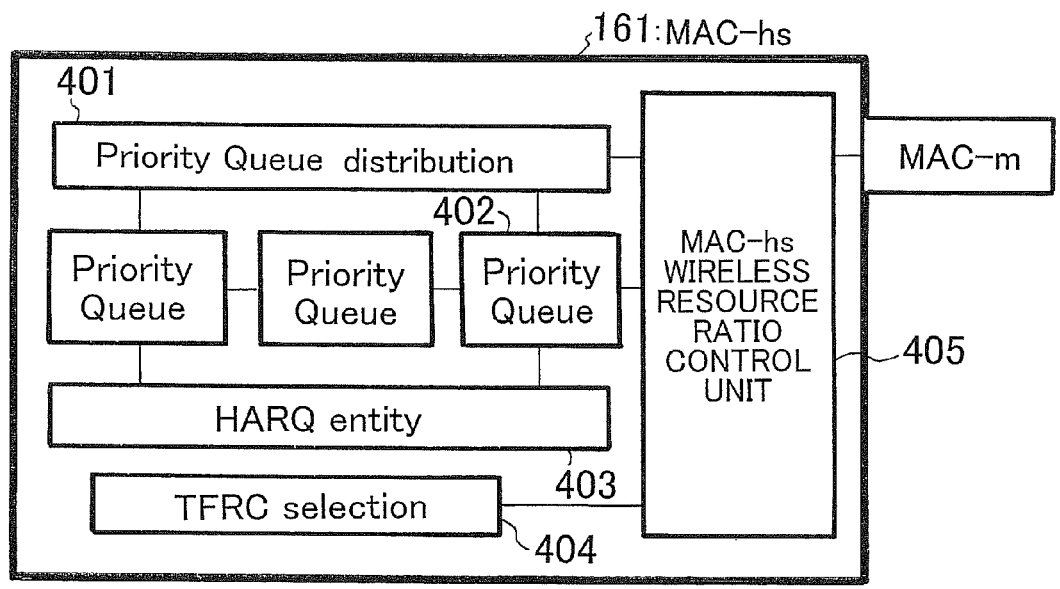

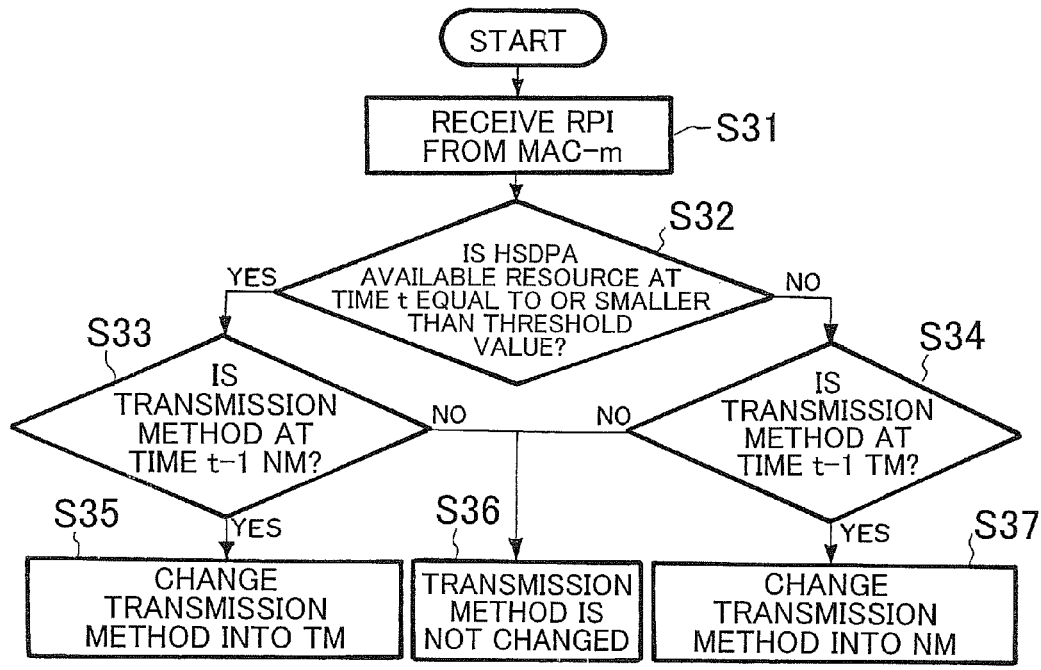
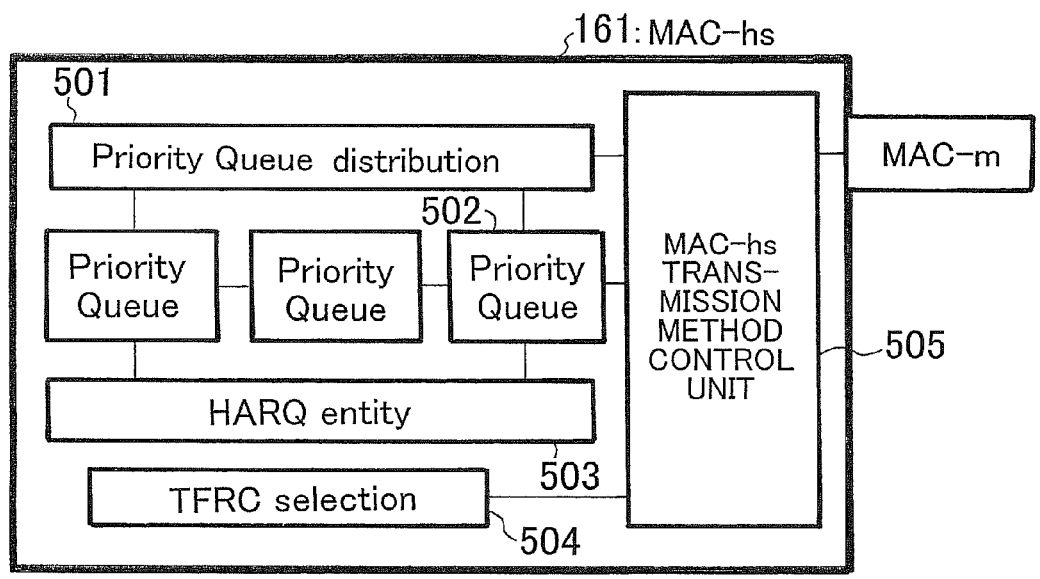

us 8,797,863 B2

MOBILE COMMUNICATION SYSTEM AND COMMUNICATION CONTROL METHOD

TECHNICAL FIELD

The present invention relates to an optimum distribution of wireless resources in plural types of transport channels in a mobile communication system.

BACKGROUND ART

In recent years, mobile communication systems conforming to the 3GPP specification are put to practical use one after another. An MBMS (Multimedia Broadcast Multicast Service) standardized in Rel. 6 of 3GPP is a technique in which a plurality of users can simultaneously share wireless resources in a base station (Node B) when the same data is transmitted to the plurality of users. This technique has a sufficient possibility of being put to practical use in the future (see Non-patent Documents 1 and 2). In this case, the wireless resources indicate transmission power, an extension code, a frequency sub-carrier, and the like. Furthermore, HSDPA (High Speed Downlink Packet Access) which has been standardized in Rel. 5 has been put to practically use as a speed-up technique for packet service of wireless downlink. In the future, when the MBMS will be put to practically use, the MBMS probably exists together with the HSDPA in a system, and is probably provided to share the same wireless resources in the base station.

In the 3GPP, a next-generation MBMS (obtained by upgrading an MBMS in Rel. 6) and next-generation HSDPA (obtained by upgrading HSDPA in Rel. 5) are being standardized. These techniques will probably coexist in the system, and will be probably provided to share the same wireless resources in the base station.

A control unit MAC (Medium Access Control) which controls communication of data (to be referred to as "MBMS data" hereinafter) transmitted by using a transport channel for MBMS and MAC which controls communication of data (to be referred to as "HSDPA data" hereinafter) transmitted by using a transport channel for HSDPA are independent as a MAC-m and a MAC-hs, respectively. The MAC-m is in a base station control apparatus (RNC), and the MAC-hs is in a base station. For this reason, sharing of wireless resources in the base station between the MBMS and the HSDPA can be realized as follows.

Of all amounts of wireless resource which can be used by base stations, an amount of wireless resource which can be used in MBMS data and an amount of wireless resource which can be used in HSDPA data are set in advance. When an MBMS transmission request is received from a core network, a control unit RRC (Radio Resource Control) which performs wireless resource management or control between a mobile station (UE) and the base station collects reception requests from mobile stations being under the control of a base station to which the MBMS data is to be transmitted. In response to the reception request, the control unit RRC determines whether the MBMS data can be transmitted in consideration of a predetermined amount of wireless resource which can be used in MBMS data. When the MBMS data can be transmitted, transmission of the MBMS data is determined.

A MAC-m in the base station control apparatus controls communication of MBMS data depending on a priority or QoS in the range of wireless resource in the MBMS data set by the RRC in advance. On the other hand, when the HSDPA receives an HSDPA transmission/reception request from a core network or a mobile station, the RRC determines whether HSDPA data can be transmitted and received in consideration of a predetermined amount of wireless resource which can be used in the HSDPA data. When the HSDPA data can be transmitted and received, transmission and reception of the HSDPA data is determined.

MAC-hs in the base station controls communication of data depending on a priority of data or a CQI (Channel Quality Indicator) of each mobile station in the range of the wireless resources for HSDPA set by the RRC in advance.

In general, wireless resource information used by each data is transmitted from the RRC to the MAC-m and the MAC-hs. However, the wireless resource information is not transmitted to a MAC which does not correspond to the data. More specifically, the wireless resource information used by the HSDPA data is not transmitted to the MAC-m, and the wireless resource information used by the MBMS data is not transmitted to the MAC-hs. Therefore, in this method, the MAC-m and MAC-hs cannot recognize amounts of wireless resource used by data which do not correspond to the MAC-m and the MAC-hs, respectively. During the communication, the wireless resources for MBMS data cannot be allocated to the HSDPA data. In contrast to this, the wireless resources for HSDPA data cannot be also allocated to the MBMS data. For this reason, as shown in FIG. 1, unused wireless resources may be generated. In FIG. 1, a portion with vertical lines denotes a wireless resource used in the HSDPA data, a blank portion denotes a wireless resource used by the MBMS data, and a portion with dotted lines denotes an unused wireless resource.

The MAC-m and the MAC-hs transmit wireless resource information used in data handled by the MAC-m and the MAC-hs to each other, so that the following scheduling can be realized. Of all the amounts of wireless resource which can be used by base stations, an amount of wireless resource which can be used in the MBMS data is set in advance. When the RRC receives an MBMS transmission request from the core network, the RRC permits the MBMS transmission request when it is determined that the MBMS can be transmitted in the wireless resource for the predetermined MBMS data.

The MAC-m in the base station control apparatus controls data communication depending on a priority or QoS between MBMS data in the range of the wireless resource for MBMS data set by the RRC in advance. On the other hand, the MAC-m notifies the MAC-hs in the base station of an amount of wireless resource actually used by the MBMS data. The MAC-hs controls data communication depending on CQI or a priority of each UE by using the remaining wireless resources which can be used in the base station.

In this manner, the MAC-m notifies the MAC-hs of the amount of wireless resource actually used by the MBMS data to make it possible to allocate all the remaining amount of wireless resource which can be used in the base station. In this manner, a usage rate of the wireless resources which can be used in the base station can be increased. In contrast to this, the MAC-hs notifies the MAC-m of the amount of wireless resource used by the HSDPA data to make it possible to increase a usage rate of the wireless resources which can be used in the base station. In FIG. 2, a portion with vertical lines denotes a wireless resource used in the HSDPA data, and a blank portion denotes a wireless resource used by the MBMS data.

There is a dispersion call control method in which a base station controller changes a transmission power of a base station allocated to channels of HSDPA data and dedicated audio data in response to the reception of a usage rate information signal (for example, see Patent Document 1).

[Patent Document 1] Japanese Patent Application Laid-Open No. 2004-166236

[Non-patent Document 1] 3GPP TS 25.321 V6.3.0 (2004-12) 3rd Generation Partnership Project; Technical Specification Group Radio Access Network; Medium Access Control (MAC) protocol specification

[Non-patent Document 2] 3GPP TS 25.346 V6.2.0 (2004-09) 3rd Generation Partnership Project; Technical Specification Group Radio Access Network; Introduction of the Multimedia Broadcast Multicast Service (MBMS) in the Radio Access Network (RAN); Stage 2

DISCLOSURE OF THE INVENTION

Problems to be Solved by the Invention

However, the above conventional technique has the following problems.

When a MAC-m notifies a MAC-hs of an amount of wireless resource used by MBMS data, the MAC-hs cannot recognize the informed amount of MBMS data a predetermined period of time before. For this reason, scheduling of a high-priority HSDPA data and a low-priority HSDPA data cannot be appropriately performed. For example, at t2 in FIG. 2, an amount of wireless resource used by the MBMS data increases, and a wireless resource which can be used by the HSDPA data decreases. For this reason, a resource which can transmit a high-priority data decreases. At this time, even though scheduling methods for the HSDPA data are changed to make it possible to more preferentially transmit the high-priority data, this cannot be actually reflected after t3. However, in contrast to this, at t3, an amount of wireless resource used by the MBMS data decreases, and an amount of wireless resource which can be used by the HSDPA data increases. Therefore, appropriate scheduling becomes difficult.

When the MAC-m notifies the MAC-hs of the amount of wireless resource used by the MBMS data, the MAC-hs may not be able to respond to a re-transmission request of an HARQ (Hybrid Autimatic Repeat reQuest). For example, at t2 in FIG. 2, an amount of wireless resource used by the MBMS data increases, and an amount of wireless resource used by the HSDPA data decreases. When a UE requests re-transmission of a large amount of data at this timing, since an amount of wireless resource which can be used by the HSDPA data is small, the data is consequently transmitted at the next timing. As a result, the data is delayed.

Therefore, an object of the present invention is to increase a usage rate of the wireless resource by allocating a wireless resource assured for MBMS data by the MAC-m to the HSDPA data by the MAC-hs when the same wireless resource is shared in a system in which an MBMS and an HSDPA coexist. The MAC-hs recognizes a variation in wireless resource state which can be used by the HSDPA data in advance and controls communication depending on the variation to select an appropriate scheduling method and a ratio of wireless resources, so that high-priority HSDPA data is maximally transmitted.

Another object of the present invention is to prevent data transmission from being delayed by performing scheduling in consideration of an HARQ.

Means for Solving the Problems

In order to solve the above objects, according to the present invention, in a mobile communication system in which an MBMS which performs multicast communication or broadcast communication in which a wireless resource is shared by a plurality of users to transmit the same data to the plurality of users and an HSDPA which performs resource allocation or scheduling for each user to transmit data to each user coexist, the same wireless resource is shared and used, wherein a MAC-m notifies a MAC-hs of information related to a wireless resource used in an MBMS transport channel at timing for transmission from a base station before the timing for transmission, the MAC-hs receives the information related to the wireless resource of the MBMS transport channel from the MAC-m, calculates a wireless resource which can be applied to data of a HSDPA transport channel at the transmission timing with using at least the information related to the wireless resource of the MBMS transport channel, and controls communication of the data in accordance with the wireless resource serving as a result of the calculation.

With the above configuration, the wireless resource assured for MBMS data in the MAC-m can be allocated to the HSDPA data by the MAC-hs.

Effect of the Invention

According to the present invention, the wireless resource assured for the MBMS data in the MAC-m can be allocated to the HSDPA data by the MAC-hs. In this manner, a usage rate of the wireless resource increases. Since the MAC-hs can recognize a variation in state of the wireless resource which can be used by the HSDPA data in advance, in a transmission state of data from a base station, an appropriate scheduling method and an appropriate wireless resource ratio can be selected. In this manner, high-priority HSDPA data can be maximally transmitted. Furthermore, since communication control of data in consideration of re-transmission control is performed, data transmission is not easily delayed.

BRIEF DESCRIPTION OF THE DRAWINGS

FIG. 4 is a diagram showing an example of Resource Planning Information, FIG. 5 is a diagram showing usage rates of wireless resources of the MBMS data and the HSDPA data in chronological order, FIG. 6 is a diagram showing diagram showing a usage rate of a wireless resource of the MBMS data in chronological order such that RPI which is transmitted from a MAC-m to a MAC-hs is caused to correspond to FIG. 5, FIG. 7 is a sequence diagram showing a flow of data from the MAC-m to the MAC-hs, FIG. 8 is a flow chart showing an operation of the MAC-hs used in the first embodiment, FIG. 9 is a block diagram showing a configuration of the MAC-hs used in the first embodiment, FIG. 10 is a block diagram showing a configuration of the MAC-m used in an embodiment of the present invention, FIG. 11 is a diagram in which a scheduler used in actual transmission of HSDPA data is written in each of the usage rates of wireless resources of the MBMS data and the HSDPA data in chronological order in the first embodiment, FIG. 12 is a diagram showing an example of a wireless resource ratio table used in a second embodiment, FIG. 13 is a flow chart showing an operation of a MAC-hs used in the second embodiment, FIG. 14 is a block diagram showing a configuration of the MAC-hs used in the second embodiment, FIG. 17 is a flow chart showing an operation of a MAC-hs used a the third embodiment, FIG. 18 is a block diagram showing a configuration of the MAC-hs used in the third embodiment.

EXPLANATION OF REFERENCE NUMERALS

Figure 1:
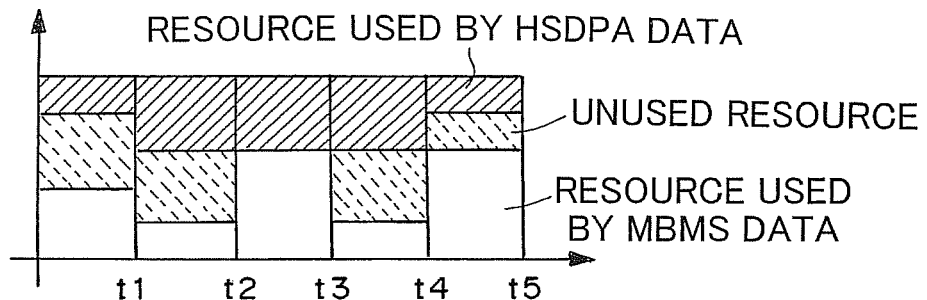
FIG. 1 is a diagram showing an in-base-station wireless resource and an unused wireless resource which are used in MBMS data and HSDPA data.
Figure 2:
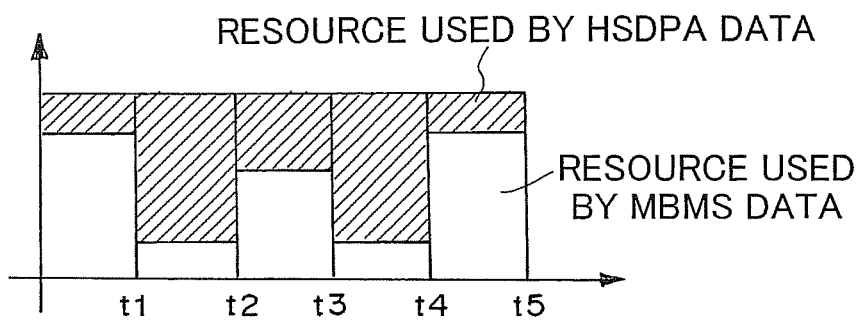
FIG. 2 is a diagram showing an in-base-station wireless resource used in the MBMS data and the HSDPA data.

10 Threshold value
101 Core network
111 Base station control apparatus
121 Base station
131, 132, 133 Mobile station
151 RRC
152 MAC-m
161 MAC-hs
201, 401, 501 Priority Queue distribution
202, 402, 502 Priority Queue
203, 403, 503 HARQ entity
204, 404, 504 TFRC selection
205 MAC-hs scheduler control unit
301 Add MBMS-ID
302 TCTF MUX
303 Priority/Buffering/Priority Handling
304 TFC selection
305 MAC-m control unit
405 MAC-hs wireless resource ratio control unit
505 MAC-hs transmission method control unit

BEST MODE FOR CARRYING OUT THE INVENTION

The present invention is applied to a process of allocating wireless resources to plural types of transport channels in a mobile communication system. As the plural type of the transport channels, a transport channel allocated to a service which performs multicast communication or broadcast communication in which the wireless resource is shared by plural users to transmit the same data to the plural users and a transport channel allocated to a service which performs resource allocation or scheduling to each user to transmit data to each user are known. A best mode of the present invention will be described below with reference to the accompanying drawings by using an MBMS and HSDPA of the 3GPP as examples.

[Embodiment 1]

Figure 3:
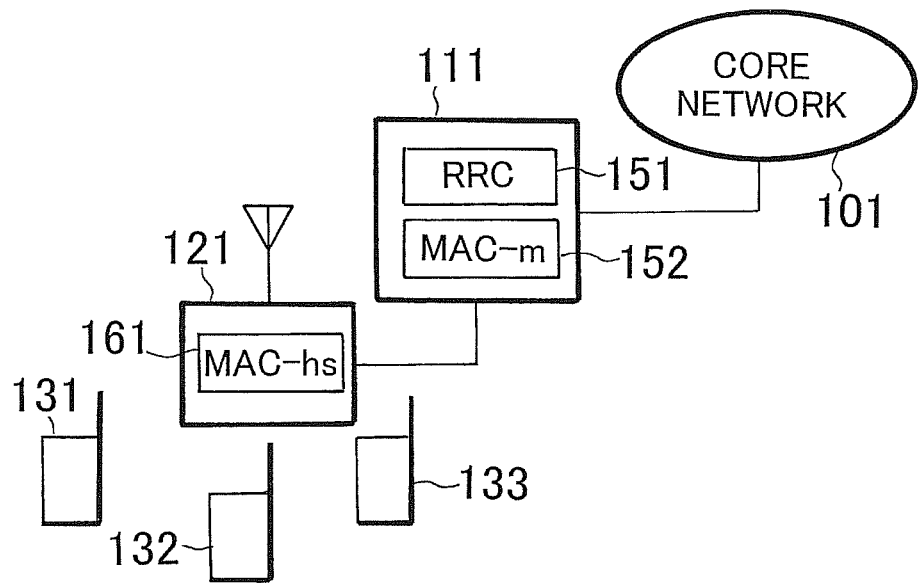
FIG. 3 is a system block diagram used in an embodiment of the present invention.

FIG. 3 is a diagram showing a system configuration used in a first embodiment of the present invention. A mobile station 131 sets a wireless channel with a base station 121 to transmit and receive MBMS data and HSDPA data. The base station 121 is also connected to mobile stations 132 and 133 other than the mobile station 131 to transmit and receive the MBMS data and the HSDPA data. The base station 121 is connected to a base station control apparatus 111. The base station control apparatus 111 includes a control unit RRC 151 which performs various control operations related to wireless channel setting between the base station 121 and the mobile stations 131, 132, and 133. A control unit MAC-m 152 which controls communication of the MBMS data is in the base station control apparatus 111. A control unit MAC-hs 161 which controls communication of the HSDPA data is in the base station 121. The base station control apparatus 111 and the base station 121 realize functions of the control unit RRC, the control unit MAC-m, and the control unit MAC-hs by control programs stored in memories of the base station control apparatus 111 and the base station 121.

FIG. 4 shows an example of RPI (Resource Planning Information) serving as wireless resource information used by the MBMS data.

FIG. 5 shows wireless resources used in the MBMS data and the HSDPA data in chronological order. An abscissa indicates scheduling data transmission unit time, and an ordinate indicates a wireless resource usage ratio. A portion with vertical lines indicates a wireless resource which can be used in the HSDPA data, and a blank portion indicates a wireless resource used in the MBMS data.

FIG. 6 shows a wireless resource usage rate and RPI of MBMS data actually transmitted from the MAC-m to the MAC-hs. RPI corresponds to FIG. 5. An abscissa indicates a scheduling unit, and an ordinate indicates a wireless resource usage rate. Reference numeral "10" in FIG. 6 denotes a predetermined threshold value. Time Tk (k: 1, 2, . . . ) is time at which the MAC-hc receives the RPI from the MAC-m. In this case, Tk=tk−Δt−TTI (tk: a transmission timing, regulated by the MAC-m, of MBMS data from a base station, Δt: time required for scheduling of the HSDPA data, and TTI: unit time used when scheduling of HSDPA is set to transmit data).

With reference to a sequence diagram (shown in FIG. 7) showing a flow of data from the MAC-m to the MAC-hs, a flow of the MBMS data will be described below. When the control unit RRC 151 receives an MBMS transmission request from a core network 101, the control unit RRC 151 collects reception requests from the mobile stations 131, 132, and 133 under the control of the base station 121 to which the MBMS data is to be transmitted. When the RRC 151 determines that the MBMS data can be transmitted in consideration of an amount of wireless resource allocated to the MBMS data in advance, the RRC 151 determines transmission of the MBMS data. The RRC 151 transmits the MBMS data and RPI of the MBMS data to the MAC-m 152. The MAC-m 152 calculates time Tk=tk−Δt−TTI (S101) and transmits the RPI of the MBMS data transmitted from the RRC 151 to the MAC-hs 161 at time Tk (S102).

On the other hand, the RRC 151 sets connections between the base station 121 and the mobile stations 131, 132, and 133. The MAC-m 152 controls communication of MBMS data depending on a priority or QoS in the range of the wireless resource for MBMS data set by the RRC 151 in advance. Thereafter, the MAC-m 152 transmits data to the mobile stations 131, 132, and 133 at time tk on a designated wireless channel through the base station 121.

A flow of the HSDPA data will be described below. When the RRC 151 receives an HSDPA transmission/reception request from the core network 101 or the mobile station 131, the RRC 151 determines whether transmission and reception of the HSDPA data should be performed or not in consideration of an amount of wireless resource allocated to the HSDPA data in advance. If it is determined that transmission/reception of the HSDPA data should be performed, the RRC 151 sets a connection between the base station 121 and the mobile station 131. The MAC-hs 161 calculates an amount of wireless resource which can be used by the HSDPA data at the transmission timing tk by using the RPI received at time Tk.

In consideration of time T2 and time T3 in FIG. 6, amounts of wireless resource which can be used by the HSDPA data at time T2 and time T3 are calculated as indicated by t2 and t3 in FIG. 5. In this manner, the MAC-hs 161 recognizes that the amount of wireless resource which can be used by the HSDPA data decreases when T2 shifts to T3 which is the next scheduling timing.

The MAC-hs 161 selects a scheduling method on the basis of the amount of wireless resource at the calculated transmission timing tk (S103). For example, when an amount of wireless resource which can be used by the HSDPA is larger than a threshold value, PF (Proportional Fairness based scheduler mode) is used to perform scheduling such that transmission probabilities of users are equalized in consideration of priority, wireless quality, or the like. When the amount of wireless resource which can be the HSDPA is smaller than the threshold value, AP (Absolute Priority based scheduler mode) is used. In this manner, the scheduling is switched to scheduling which can transmit high-priority data at a higher probability. More specifically, as the scheduling method, the PF is used until time t2, and the PF is switched to AP at time t3; therefore, high priority data can be transmitted in a larger amount. Since it is known in advance that the amount of wireless resource which can be used by the HSDPA is larger than the threshold value at time t7, AP can be returned to PF.

The MAC-hs 161 controls communication of data depending on a priority of data or a CQI (Channel Quality Indicator) of each UE according to the changed scheduling method in the range of the wireless resource for HSDPA calculated on the basis of the RPI. The MAC-hs 161 transmits the data to the mobile station 131 on a designated wireless channel through the base station 121 at time tk (S104).

FIG. 8 is a flow chart showing a concrete operation of the MAC-hs. When the MAC-hs 161 receives the RPI from the MAC-m 152 (S11), the MAC-hs 161 calculates an amount of wireless resource. The MAC-hs 161 changes the scheduler from PF to AP (S15) when the amount of wireless resource which can be used by HSDPA is equal to or smaller than the threshold value at time tk (S12: Yes) and when a scheduler at time tk−1 is PF (S13: Yes). When the scheduler at time tk−1 is AP (S13: No), the scheduler is not changed (S16). When an amount of wireless resource which can be used by the HSDPA at time tk is larger than the threshold value (S12: No) and when the scheduler at time tk−1 is AP (S14: Yes), the scheduler is changed from AP to PF (S17). When the scheduler at time tk−1 is PF (S14: No), the scheduler is not changed (S16).

FIG. 9 shows a configuration of the MAC-hs 161 according to the embodiment. A Priority Queue distribution 201 distributes data received from the base station control apparatus to a plurality of queues depending on priorities. A Priority Queue 202 stores the data distributed by the Priority Queue distribution 201 and sequentially transmits the data. An HARQ entity 203 receives a re-transmission request from the UE to perform re-transmission control. A TFRC (Transport Format Resource Combination) selection 204 selects a Transport Format and a wireless resource which are suitable for transmission of data. A MAC-hs scheduler management unit 205 manages a scheduler method in the MAC-hs.

When the RRC 151 permits transmission of the MBMS data, the RRC 151 transmits the MBMS data and RPI of the MBMS data to the MAC-m 152. The MAC-m 152 transmits the transmitted RPI of the MBMS data to the MAC-hs scheduler management unit 205 in the MAC-hs 161. At this time, receiving time in the MAC-hs scheduler management unit 205 is represented by Tk. The MAC-hs scheduler management unit 205 calculates the transmission timing tk of the MBMS data by using the received RPI and calculates an amount of available wireless resource of the HSDPA data at tk by using the amount of used wireless resource of the MBMS data at the transmission timing tk.

Furthermore, the MAC-hs scheduler management unit 205 employs PF as a scheduler when an amount of wireless resource which can be used by the HSDPA is larger than a threshold value, and employs AP when the amount of wireless resource is smaller than the threshold value. In this manner, the MAC-hs scheduler management unit 205 controls communication of the HSDPA data depending on an amount of wireless resource calculated with respect to the HSDPA data. The communication control is performed such that a wireless resource which is not used at time tk is not generated and high-priority data is maximally transmitted.

FIG. 10 shows a configuration of the MAC-m 152 according to the embodiment. An Add MBMS-ID 301 adds MBMS-ID to data received from the base station control apparatus. A TCTF (Target Channel Type Field) MUX 302 gives a type of a Logical channel to the received data. A Scheduling/Buffering/Priority Handling 303 controls scheduling and priority. The TFC selection 304 performs mapping between a Transport channel and the Logical channel. A MAC-m control management unit 305 performs control management in the MAC-m.

When the RRC 151 permits transmission of the MBMS data, the RRC 151 transmits the MBMS data and RPI of the MBMS data to the MAC-m control management unit 305. The MAC-m control management unit 305 transmits the transmitted RPI of the MBMS data to the MAC-hs 161.

FIG. 11 is obtained by recording a scheduler used in transmission of the HSDPA data. As described above, a wireless resource assured for the MBMS data by the MAC-m 152 can be allocated to the HSDPA data by the MAC-hs 161. In this manner, in addition to improvement of a wireless resource usage rate, since the MAC-hs 161 receives the RPI at time Δt+TTI earlier than actual transmission timing tk of the HSDPA data, PF can be switched to AP as a scheduler used in transmission of the HSDPA data at time tk. Therefore, according to AP, high-priority data the amount of which is larger than that obtained in PF can be transmitted.

[Embodiment 2]

In a second embodiment, high-priority data can be maximally transmitted without changing scheduling methods in the first embodiment. FIGS. 3, 4, 5, 6 and 10 are common in the first embodiment.

FIG. 12 is an example of a wireless resource ratio used in transmission of HSDPA data.

A flow of the MBMS data in the embodiment will be described below. When an RRC 151 receives an MBMS transmission request from the core network 101, the RRC 151 collects reception requests from the mobile stations 131, 132, and 133 under the control of the base station 121 to which the MBMS data is to be transmitted. When the RRC 151 determines that the MBMS data can be transmitted in consideration of a predetermined amount of wireless resource which can be used by the MBMS data, the RRC 151 determines transmission of the MBMS data. The RRC 151 transmits the MBMS data and RPI of the MBMS data to the MAC-m 152. The MAC-m 152 transmits the transmitted RPI of the MBMS data to the MAC-hs 161 at time Tk.

On the other hand, the RRC 151 sets connections between the base station 121 and the mobile stations 131, 132, and 133. The MAC-m 152 controls communication of MBMS data depending on a priority or QoS in the range of the wireless resource for MBMS data set by the RRC 151 in advance. The MAC-m 152 transmits data to the mobile stations 131, 132, and 133 on a designated wireless channel through the base station 121.

A flow of the HSDPA data in the embodiment will be described below. When the RRC 151 receives an HSDPA transmission/reception request from the core network 101 or the mobile station 131, the RRC 151 determines transmission/reception of the HSDPA data when it is determined that transmission/reception of the HSDPA data can be performed in consideration of an amount of wireless resource which can be used by the HSDPA data. The RRC 151 sets a connection between the base station 121 and the mobile station 131. The MAC-hs 161 calculates an amount of wireless resource which can be used by the HSDPA data at transmission timing tk by using the received RPI.

In consideration of time T2 and time T3 in FIG. 6, amounts of wireless resource which can be used by the HSDPA data at time T2 and time T3 are calculated as indicated by t2 and t3 in FIG. 5. In this manner, the MAC-hs 161 recognizes that the amount of wireless resource which can be used by the HSDPA data decreases when T2 shifts to T3 which is the next scheduling timing.

The MAC-hs 161 receives the RPI at time Δt+TTI earlier than actual transmission timing tk of the HSDPA data. Therefore, when the amount of wireless resource which can be used by the HSDPA is larger than a threshold value, mode 1 having a normal wireless resource ratio is used. When the amount of wireless resource which can be used by the HSDPA is smaller than the threshold value, mode 2 having a wireless resource ratio weighted to make it possible to transmit high-priority data the amount of which is larger than that in a normal state is used. More specifically, mode 1 in FIG. 12 is used until time t2, and mode 1 is switched to mode 2 at time t3. In this manner, the high-priority data can be maximally transmitted.

Since it is known that an amount of wireless resource which can be used by the HSDPA is larger than the threshold value at time t7, the wireless resource ratio can be returned to mode 1. The MAC-hs 161 controls communication of data depending on a CQI of each UE in the range of the wireless resource for HSDPA calculated from the RPI and then transmits the data to the mobile station 131 on a designated wireless channel through the base station 121.

FIG. 13 is a flow chart showing a concrete operation of the MAC-hs 161. When the MAC-hs 161 receives RPI from the MAC-m 152 (S21), the MAC-hs 161 calculates an amount of wireless resource. When the amount of wireless resource which can be used by the HSDPA is equal to or smaller than the threshold value at time tk (S22: Yes) and when the wireless resource ratio at time kt−1 is mode 1 (S23: Yes), the MAC-hs 161 changes the wireless resource ratio into mode 2 (S25). When the wireless resource ratio at time tk−1 is mode 2 (S23: No), modes are not changed (S26). When the amount of wireless resource which can be used by the HSDPA at time tk is larger than the threshold value (S22: No) and when the wireless resource ratio at time tk−1 is mode 2 (S24: Yes), the wireless resource ratio is changed into mode 1 (S27). When the wireless resource ratio at time tk−1 is mode 1 (S24: No), modes are not changed (S26).

FIG. 14 shows a configuration of the MAC-hs 161 according to the embodiment. A Priority Queue distribution 401 distributes data received from the base station control apparatus to a plurality of queues depending on priorities. A Priority Queue 402 stores the data distributed by the Priority Queue distribution and sequentially transmits the data. An HARQ entity 403 receives a re-transmission request from the UE to control re-transmission. A TFRC (Transport Format Resource Combination) selection 404 selects a Transport Format and a wireless resource which are suitable for transmission of data. A MAC-hs wireless resource ratio management unit 405 manages a wireless resource ratio in the MAC-hs.

When the RRC 151 permits transmission of the MBMS data, the RRC 151 transmits the MBMS data and RPI of the MBMS data to the MAC-m 152. The MAC-m 152 transmits the transmitted RPI of the MBMS data to the MAC-hs wireless resource ratio management unit 405 in the MAC-hs 161. At this time, receiving time in the MAC-hs wireless resource ratio management unit 405 is represented by Tk. The MAC-hs wireless resource ratio management unit 405 calculates the transmission timing Tk of the MBMS data by using the received RPI and calculates an amount of available wireless resource of the HSDPA data at tk by using the amount of used wireless resource of the MBMS data at Tk.

The MAC-hs wireless resource ratio management unit 405 employs mode 1 when an amount of wireless resource which can be used by the HSDPA is larger than a threshold value, and employs mode 2 when the amount of wireless resource is smaller than the threshold value. In this manner, the MAC-hs wireless resource ratio management unit 405 controls communication of the HSDPA data depending on the calculated amount of wireless resource of the HSDPA data. As a result, the communication control is performed such that a wireless resource which is not used at time tk is not generated and high-priority data is maximally transmitted.

Figure 15:
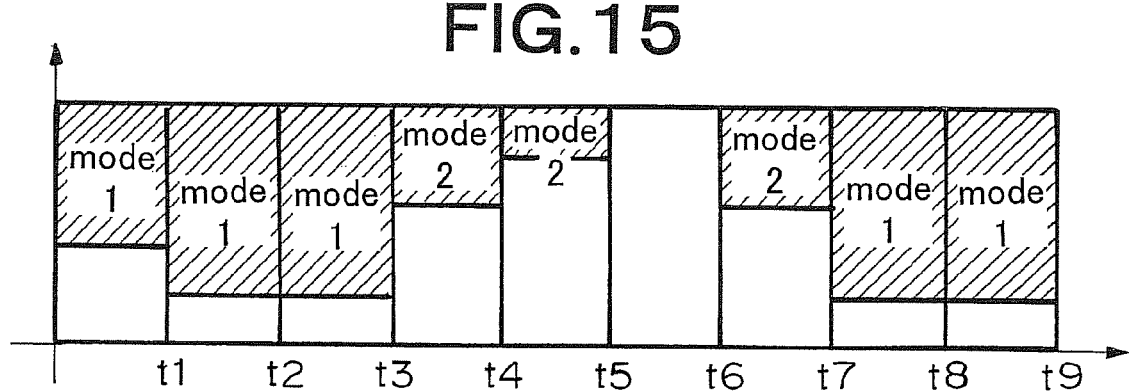
FIG. 15 is a diagram in which a wireless resource ratio used in actual transmission of HSDPA data is written in each of the usage rates of wireless resources of MBMS data and HSDPA data in chronological order in the second embodiment.

FIG. 15 shows a record of a wireless resource ratio used in transmission of the HSDPA data. As described above, a wireless resource assured for the MBMS data by the MAC-m 152 can be allocated to the HSDPA data by the MAC-hs 161. In this manner, in addition to improvement of a wireless resource usage rate, since the MAC-hs 161 receives the RPI at time Δt+TTI earlier than actual transmission timing tk of the HSDPA data, mode 1 can be switched to mode 2 as a wireless resource ratio used in transmission of the HSDPA data at time tk. Therefore, according to mode 2, high-priority data the amount of which is larger than that obtained in mode 1 can be transmitted.

[Embodiment 3]

In a third embodiment, in the first embodiment, transmission in consideration of HARQ (re-transmission control) in scheduling performed by the MAC-hs 161 can be performed. FIGS. 3, 4, 5, 6, and 10 are common in the first embodiment.

Time Tk is reception time in the MAC-hs 161 of RPI transmitted from the MAC-m 152. In this case, Tk=tk−Δt−2×TTI (tk: a timing, regulated by the MAC-m, of transmission from a base station of MBMS data, Δt: time required for scheduling of HSDPA data, and TTI: unit time used when scheduling of HSDPA is set to transmit data).

Figure 16:
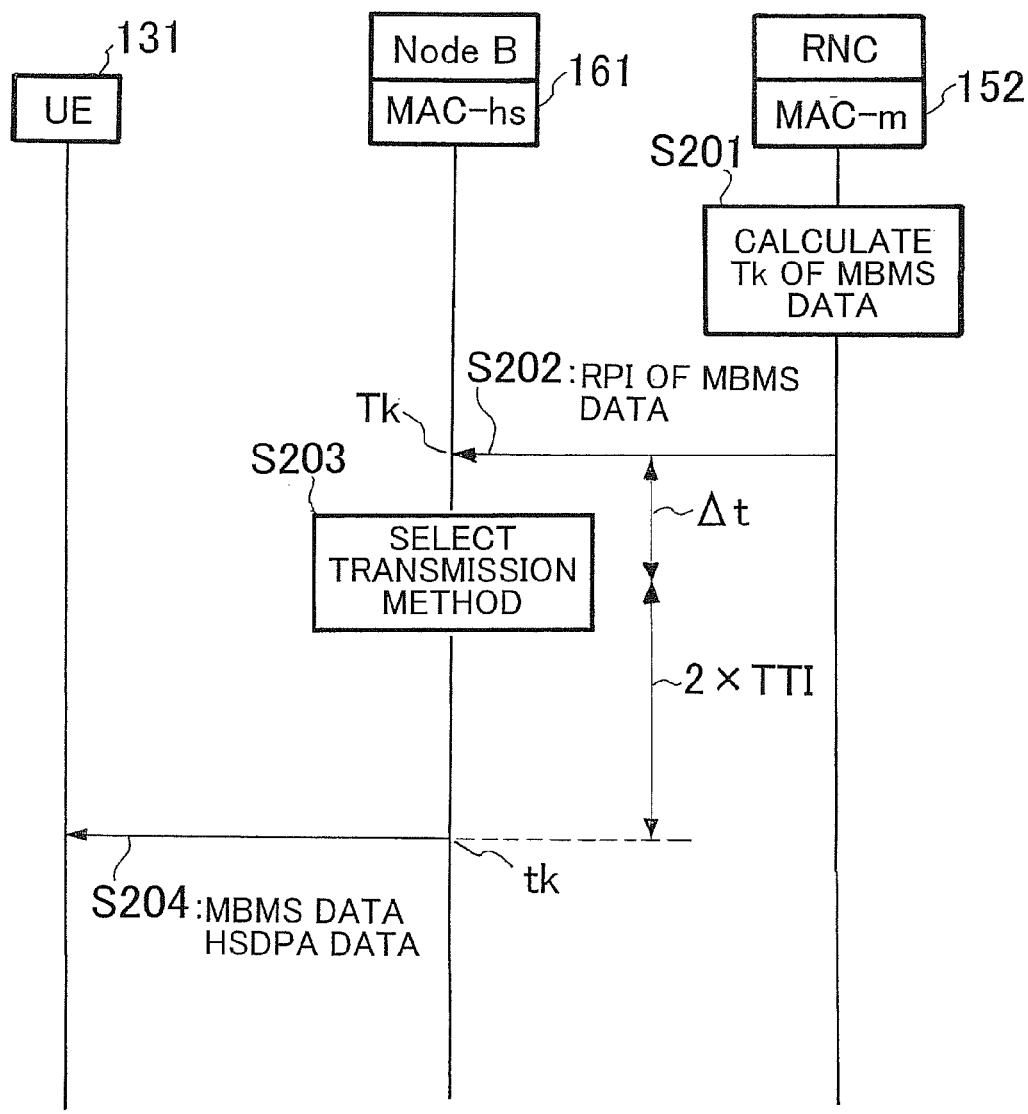
FIG. 16 is a sequence diagram showing a flow of data from the MAC-m to the MAC hs.

With reference to a sequence diagram (shown in FIG. 16) showing a flow of data from the MAC-m to the MAC-hs, a flow of the MBMS data will be described below. When the control unit RRC 151 receives an MBMS transmission request from a core network 101, the control unit RRC 151 collects reception requests from the mobile stations 131, 132, and 133 under the control of the base station 121 to which the MBMS data is to be transmitted. When the RRC 151 determines that the MBMS data can be transmitted in consideration of an amount of wireless resource which can be used in the MBMS data, the RRC 151 determines transmission of the MBMS data. The RRC 151 transmits the MBMS data and RPI of the MBMS data to the MAC-m 152. The MAC-m 152 calculates time Tk=tk−Δt−2×TTI (S201) and transmits the RPI of the MBMS data transmitted from the RRC 151 to the MAC-hs 161 at time Tk (S202).

On the other hand, the RRC 151 sets connections between the base station 121 and the mobile stations 131, 132, and 133. The MAC-m 152 controls communication of MBMS data depending on a priority or QoS in the range of the wireless resource for MBMS data set by the RRC 151 in advance. Thereafter, the MAC-m 152 transmits data to the mobile stations 131, 132, and 133 on a designated wireless channel through the base station 121.

A flow of the HSDPA data according to the embodiment will be described below. When the RRC 151 receives an HSDPA transmission/reception request from the core network 101 or the mobile station 131, the RRC 151 determines transmission/reception of the HSDPA data when it is determined that transmission/reception of the HSDPA data can be performed in consideration of an amount of wireless resource which can be used in the HSDPA data. The RRC 151 sets a connection between the base station 121 and the mobile station 131. The MAC-hs 161 calculates an amount of wireless resource which can be used by the HSDPA data at the transmission timing tk by using the received RPI.

In consideration of time T2 and time T3 in FIG. 6, amounts of wireless resource which can be used by the HSDPA data at time T2 and time T3 are calculated as indicated by t2 and t3 in FIG. 5. In this manner, the MAC-hs 161 recognizes that the amount of wireless resource which can be used by the HSDPA data decreases when T2 shifts to T3 which is the next scheduling timing.

The MAC-hs 161 selects a scheduling method on the basis of the amount of wireless resource at the calculated transmission timing tk (S203). For example, when a large amount of HSDPA data is transmitted at time t2, a reception error frequently occurs at mobile stations. When a large number of re-transmission requests are generated, all re-transmission data may not be transmitted at time t3. Therefore, when it is known that an amount of data at time t3 is smaller than a threshold value, in data transmission at time t2, a transmission power is temporarily increased to make it possible to control without generating a data re-transmission request. A transmission method which controls without generating a data re-transmission request is defined as TM (Turbo Mode). On the other hand, a normal transmission method is defined as NM (Normal Mode). Since an amount of wireless resource which can be used by the HSDPA is larger than a threshold value at time t7, the method can be returned to NM to perform transmission.

As a method which controls without generating a re-transmission request except for that in the embodiment, decreasing diffusion rate, decreasing rate of a modulation scheme, decreasing value of a CQI, and the like are used. The MAC-hs 161 controls communication of data depending on a priority or a CQI of each UE in the range of the wireless resource for HSDPA calculated from the RPI. The data is transmitted to the mobile station 131 on a designated wireless channel through the base station 121 (S204).

FIG. 17 is a flow chart showing a concrete operation of the MAC-hs. The MAC-hs 161 receives RPI from the MAC-m 152 (S31) to calculate an amount of wireless resource. When the amount of wireless resource which can be used by the HSDPA is equal to or smaller than the threshold value at time tk (S32: Yes) and when the transmission method at time tk−1 is NM (S33: Yes), the MAC-hs 161 changes the transmission method into TM (S35). When the transmission method at time tk−1 is TM (S33: No), the transmission method is not changed (S36). When the amount of wireless resource which can be used by the HSDPA at time tk is larger than the threshold value (S32: No) and when the transmission method at time tk−1 is TM (S34: Yes), the transmission method is changed into NM (S37). When the transmission method at time tk−1 is NM (S34: No), the transmission methods are not changed (S36).

FIG. 18 shows a configuration of the MAC-hs 161 according to the embodiment. A Priority Queue distribution 501 distributes data received from the base station control apparatus to a plurality of queues depending on priorities. A Priority Queue 502 stores the data distributed by the Priority Queue distribution and sequentially transmits the data. An HARQ entity 503 receives a re-transmission request from the UE to controls re-transmission. A TFRC (Transport Format Resource Combination) selection 504 selects a Transport Format and a wireless resource which are suitable for transmission of data. A MAC-hs transmission method control unit 505 manages transmission methods in the MAC-hs.

When the RRC 151 permits transmission of the MBMS data, the RRC 151 transmits the MBMS data and RPI of the MBMS data to the MAC-m 152. The MAC-m 152 transmits the transmitted RPI of the MBMS data to the MAC-hs transmission method control unit 505 in the MAC-hs 161. At this time, receiving time in the MAC-hs transmission method control unit 505 is represented by tk. The MAC-hs transmission method control unit 505 calculates the transmission timing Tk of the MBMS data by using the received RPI and calculates an amount of available wireless resource of the HSDPA data at tk by using the amount of used wireless resource of the MBMS data at Tk.

The MAC-hs transmission method control unit 505 sets NM as the transmission method when the transmission method at time tk−1 is TM and an amount of wireless resource which can be used by the HSDPA is larger than a threshold value at time tk. The MAC-hs transmission method control unit 505 switches the transmission method to TM when the transmission method at time tk−1 is NM and the amount of wireless resource which can be used by the HSDPA at tk is smaller than the threshold value. When communication control of the HSDPA data is performed according to the changed transmission method, an unused wireless resource is not generated at time tk, and transmission delay can be reduced by controlling the number of times of occurrence of re-transmission.

The configuration of the embodiment is not limited to the above description. The embodiment can be executed even though plural base stations are connected to a base station control apparatus to simultaneously transmit the same MBMS data from the plurality of base stations. In this case, the MAC-m in the base station control apparatus transmits the same RPI to a plurality of MAC-hs, and each MAC-hs calculates an available wireless resource of the HSDPA data to select a transmission method depending on a calculation result and to transmit the HSDPA data. Since the control does not influence transmission time or a wireless resource of the MBMS data, a mobile station can receive the MBMS data from the plurality of base stations at once. Furthermore, the control is also effective when SHO (Soft Handover) control is performed.

Figure 19:
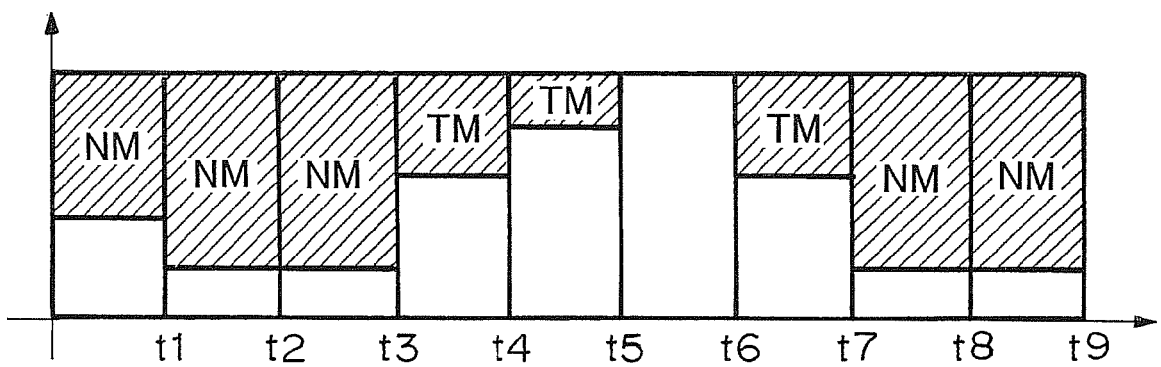
FIG. 19 is a diagram in which a transmission method used in actual transmission of HSDPA data is written in each of the usage rates of wireless resources of MBMS data and HSDPA data in chronological order in the third embodiment.

FIG. 19 shows a record of a transmission method used when the HSDPA data is transmitted. As described above, a wireless resource assured for the MBMS data by the MAC-m 152 can be allocated to the HSDPA data by the MAC-hs 161. In this manner, in addition to improvement of a wireless resource usage rate, since the MAC-hs 161 receives the RPI at time Δt+2×TTI earlier than actual transmission timing tk of the HSDPA data, the transmission method can be controlled such that a data re-transmission request does not occur before time tk. As a result, data transmission can be prevented from being delayed.

The first to third embodiments have been described above. However, control can also be performed by combining the embodiments.

In the embodiments described above, the MAC-m 152 is in the base station control apparatus (111), and the MAC-hs 161 is in the base station (121). However, a configuration in which these MACS (control units) are arranged in the same apparatus can also be effected.

In the above embodiment, time at which the MAC-m 152 transmits wireless resource information at data transmission time of the base station is calculated by using time required for scheduling by the MAC-hs 161 and scheduling data transmission unit time. However, the time can be made variable depending on conditions.

Industrial Applicability

The present invention can be applied to a mobile communication system which performs multicast communication or broadcast communication on a plurality of types of transport channels.

The invention claimed is:

1. A mobile communication system that communicates by using a plurality of channels, comprising:
   a first control unit and a second control unit, wherein
      the first control unit transmits information, regarding a wireless resource to be used for data transmission on a first channel and a future transmission timing of the first channel, to the second control unit,
      the second control unit determines a wireless resource which can be applied to data transmission of a second channel by using at least the information regarding the wireless resource and the future transmission timing of the first channel and controls communication of data on the second channel in accordance with the determined wireless resource, and
      the first control unit calculates a timing at which the information regarding the wireless resource and the future transmission timing is transmitted, on the basis of a time required for scheduling by the second control unit and a unit time for transmission of scheduling data,
      the second control unit uses a first scheduling method when the determined wireless resource exceeds a predetermined threshold value and uses a second scheduling method, different from the first scheduling method, when the determined wireless resource is equal to or smaller than the predetermined threshold value,
      the first scheduling method is a scheduling method which equalizes transmission probabilities of users on the basis of a priority or wireless quality upon the control of communication, and
      the second scheduling method is a scheduling method which can transmit high-priority data at a high probability upon the control of communication.

2. The mobile communication system according to claim 1, wherein:
   the first channel is a channel to perform multicast communication or broadcast communication in which a wireless resource is shared by a plurality of users to transmit the same data to the plurality of users, and
   the second channel is a channel which performs source allocation or scheduling to each user to transmit data to each user.

3. The mobile communication system according to claim 1, wherein the first control unit is included in a base station control apparatus of the mobile communication system, and the second control unit is included in a base station of the mobile communication system.

4. A communication control method for a mobile communication system which communicates by using a plurality of channels, the method comprising:
   transmitting information, regarding a wireless resource to be used for data transmission on a first channel and a future transmission timing of the first channel, from a first control unit to a second control unit;
   determining a wireless resource which can be applied to data transmission of a second channel by using at least the information regarding the wireless resource and the future transmission timing of the first channel;
   controlling communication of data on the second channel in accordance with the determined wireless resource; and
   calculating, prior to the transmitting information, a timing at which the information regarding the wireless resource and the future transmission timing is transmitted, on the basis of a time required for scheduling by the second control unit and a unit time for transmission of scheduling data,
   wherein the controlling communication of data on the second channel comprises using a first scheduling method when the determined wireless resource exceeds a predetermined threshold value and using a second scheduling method, different from the first scheduling method, when the determined wireless resource is equal to or smaller than the threshold value,
   wherein the first scheduling method is a scheduling method which equalizes transmission probabilities of users on the basis of a priority or wireless quality upon the control of communication, and
   wherein the second scheduling method is a scheduling method which can transmit high-priority data at a high probability upon the control of communication.

5. The communication control method according to claim 4, wherein
   the first channel is a channel to perform multicast communication or broadcast communication in which a wireless resource is shared by a plurality of users to transmit the same data to the plurality of users, and
   the second channel is a channel which performs source allocation or scheduling to each user to transmit data to each user.

6. The communication control method according to claim 4, wherein the first control unit is included in a base station control apparatus of the mobile communication system, and the second control unit is included in a base station of the mobile communication system.

7. A control unit in a mobile communication system which communicates by using a plurality of channels, wherein the control unit
   receives information regarding a wireless resource to be used for data transmission on a first channel and a future transmission timing of the first channel; and
   determines, by using at least the future transmission timing of the first channel, a wireless resource which can be applied to data transmission of a second channel and controls communication of data on the second in accordance with the determined resource,
   wherein a timing at which the information regarding the wireless resource and the future transmission timing is transmitted to the control unit is calculated on the basis of a time required for scheduling by the control unit and a unit time for transmission of scheduling data, wherein the control unit uses a first scheduling method when the determined wireless resource exceeds a predetermined threshold value and uses a second scheduling method, different from the first scheduling method, when the determined wireless resource is equal to or smaller than the threshold value, wherein the first scheduling method is a scheduling method which equalizes transmission probabilities of users on the basis of a priority or wireless quality is used upon the control of communication, and wherein the second scheduling method is a scheduling method which can transmit high-priority data at a high probability is used upon the control of communication.

8. The control unit according to claim 7, wherein the timing at which the information regarding the wireless resource and the future transmission timing is transmitted is calculated by adding a time required for scheduling by a control unit of receiving side and a unit time for transmission of scheduling data.

9. A base station comprising a control unit according to claim 7.

10. A non-transitory computer-readable medium storing a program causing a computer of a control unit in a mobile communication system which communicates by using a plurality of channels to execute functions of:

determining, by using at least information, received from another control unit and regarding a wireless resource to be used for data transmission on a first channel and a future transmission timing of the first channel, a wireless resource which can be applied to data transmission on a second channel; and controlling communication of data on the second channel in accordance with the determined resource, wherein a timing at which the information regarding the wireless resource and the future transmission timing is transmitted to the computer, is calculated on the basis of a time required for scheduling by the control unit and a unit time for transmission of scheduling data, wherein the controlling communication of data on the second channel comprises using a first scheduling method when the determined wireless resource exceeds a predetermined threshold value and using a second scheduling method, different from the first scheduling method, when the determined wireless resource is equal to or smaller than the threshold value, wherein the first scheduling method is a scheduling method which equalizes transmission probabilities of users on the basis of a priority or wireless quality upon the control of communication, and wherein the second scheduling method is a scheduling method which can transmit high-priority data at a high probability upon the control of communication.

11. A mobile station in a communication system comprising a first control unit, a second control unit and the mobile station, wherein the first control unit transmits information, regarding a wireless resource to be used for data transmission on a first channel and a future transmission timing of the first channel, to the second control unit, the first control unit calculates a timing at which the information regarding the wireless resource and the future transmission timing is transmitted, on the basis of a time required for scheduling by the second control unit and a unit time for transmission of scheduling data, the second control unit determines a wireless resource which can be applied to data of a second channel with using at least the information regarding the wireless resource and the future transmission timing of the first channel and controls communication of data on the second channel in accordance with the determined wireless resource, and the mobile station receives data transmitted by the second control unit, the second control unit uses a first scheduling method when the determined wireless resource exceeds a predetermined threshold value and uses a second scheduling method, different from the first scheduling method, when the determined wireless resource is equal to or smaller than the predetermined threshold value, the first scheduling method is a scheduling method which equalizes transmission probabilities of users on the basis of a priority or wireless quality upon the control of communication, and the second scheduling method is a scheduling method which can transmit high-priority data at a high probability upon the control of communication.

12. A communication method for a mobile station in a communication system comprising a first control unit, a second control unit and the mobile station, the method comprising:

transmitting, from the first control unit to the second control unit, information regarding a wireless resource to be used for data transmission on a first channel and a future transmission timing of the first channel;

determining, at the second control unit, a wireless resource which can be applied to data of a second channel by using at least the information regarding the wireless resource and the future transmission timing of the first channel;

controlling, at the second control unit, communication of data on the second channel in accordance with the determined wireless resource; and receiving, at the mobile station, data transmitted by the second control unit, wherein a timing at which the information regarding the wireless resource and the future transmission timing is transmitted, is calculated on the basis of a time required for scheduling by the control unit and a unit time for transmission of scheduling data wherein the controlling, at the second control unit, the communication of data on the second channel comprises using a first scheduling method when the determined wireless resource exceeds a predetermined threshold value and using a second scheduling method, different from the first scheduling method, when the determined wireless resource is equal to or smaller than the threshold value, wherein the first scheduling method is a scheduling method which equalizes transmission probabilities of users on the basis of a priority or wireless quality upon the control of communication, and wherein the second scheduling method is a scheduling method which can transmit high-priority data at a high probability upon the control of communication.

* * * * *